(12) United States Patent
Yamamoto (10) Patent No.: US 12,497,009 B2
(45) Date of Patent: Dec. 16, 2025

(54) VEHICLE STOP DETERMINATION DEVICE

(71) Applicant: ADVICS CO., LTD., Kariya (JP)

(72) Inventor: Yusaku Yamamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 182 days.

(21) Appl. No.: 18/026,871

(22) PCT Filed: Sep. 30, 2021

(86) PCT No.: PCT/JP2021/036184
§ 371 (c)(1),
(2) Date: Mar. 17, 2023

(87) PCT Pub. No.: WO2022/071501
PCT Pub. Date: Apr. 7, 2022

(65) Prior Publication Data
US 2023/0331204 A1  Oct. 19, 2023

(30) Foreign Application Priority Data
Sep. 30, 2020 (JP) .................. 2020-166219

(51) Int. Cl.
*B60T 8/58* (2006.01)
*B60T 8/171* (2006.01)

(52) U.S. Cl.
CPC ............... *B60T 8/58* (2013.01); *B60T 8/171* (2013.01); *B60T 2210/30* (2013.01); *B60T 2210/32* (2013.01); *B60T 2240/00* (2013.01)

(58) Field of Classification Search
CPC ........ B60T 8/58; B60T 8/171; B60T 2210/30; B60T 2210/32; B60T 2240/00
See application file for complete search history.

(56) References Cited

U.S. PATENT DOCUMENTS

| | | | | |
|---|---|---|---|---|
| 2018/0154825 | A1* | 6/2018 | Tanaka | G06V 20/58 |
| 2020/0223407 | A1* | 7/2020 | Yasui | G05D 1/0257 |
| 2022/0161769 | A1* | 5/2022 | Muramatsu | B60T 7/22 |

FOREIGN PATENT DOCUMENTS

JP    2016028913 A  *  3/2016

OTHER PUBLICATIONS

English Machine Translation of JP-2016028913-A (Year: 2016).*
International Search Report (PCT/ISA/210) with English translation and Written Opinion (PCT/ISA/237) mailed on Nov. 30, 2021, by the Japanese Patent Office as the International Searching Authority for International Application No. PCT/JP2021/036184.

* cited by examiner

*Primary Examiner* — Andrew J Cromer
(74) *Attorney, Agent, or Firm* — BUCHANAN INGERSOLL & ROONEY PC (57) ABSTRACT

A vehicle stop determination device includes: a vehicle wheel speed sensor that outputs a signal according to a rotational speed of vehicle wheels; an acquisition unit that acquires a wheel speed at a predetermined reference time that a vehicle decelerates, based on an output signal of the vehicle wheel speed sensor; a derivation unit that derives a stopping position where the vehicle stops, based on the wheel speed acquired by the acquisition unit; and a determination unit that executes a stop determination to determine that the vehicle has stopped, when a difference distance between a position of the vehicle after the reference time and the stopping position is a stop determination value or less.

12 Claims, 4 Drawing Sheets

BRAKING FORCE

FIG. 3B

VEHICLE BODY SPEED

FIG. 3C

TRAVEL DISTANCE

FIG. 4A

BRAKING FORCE

FIG. 4B

VEHICLE BODY SPEED

FIG. 4C

TRAVEL DISTANCE

VEHICLE STOP DETERMINATION DEVICE

TECHNICAL FIELD

The present disclosure relates to a vehicle stop determination device.

BACKGROUND ART

PTL 1 discloses one example of a vehicle stop determination device that suppresses pitching behavior when a vehicle is about to stop, by reducing a braking force applied to the vehicle, below a required braking force of a driver immediately before the vehicle stops.

CITATION LIST

Patent Literature

PTL 1: JP2016-28913A

SUMMARY

Technical Problem

When the vehicle stop determination device described above determines that the vehicle has stopped, the vehicle stop determination device causes an increase in the braking force applied to the vehicle, so as to maintain the state where the vehicle has stopped. For this reason, the vehicle stop determination device described above needs to accurately determine whether the vehicle has stopped. Generally, such circumstances are common to a vehicle stop determination device that changes control contents for various actuators of a vehicle before and after the vehicle stops.

Solution to Problem

Hereinafter, means for solving the foregoing problem and actions and effects thereof will be described.

In order to solve the foregoing problem, there is provided a vehicle stop determination device including: a vehicle wheel speed sensor that outputs a signal according to a rotational speed of a wheel; an acquisition unit that acquires a wheel speed at a predetermined reference time that a vehicle decelerates, based on an output signal of the vehicle wheel speed sensor; a derivation unit that derives a stopping position where the vehicle stops, based on the wheel speed acquired by the acquisition unit; and a determination unit that executes a stop determination to determine that the vehicle has stopped, when a difference distance between a position of the vehicle after the reference time and the stopping position is a stop determination value or less.

When the vehicle body speed is extremely low, such as immediately before the vehicle stops, it may be difficult to accurately acquire the wheel speed based on the output signal of the vehicle wheel speed sensor. In this regard, the vehicle stop determination device determines whether the vehicle has stopped, based on the difference distance between the position of the vehicle, which changes as the vehicle travels, and the stopping position derived in advance. For this reason, in the case where the difference distance between the position of the vehicle and the stopping position is larger than the stop determination value, even when the wheel speed acquired based on the output signal of the vehicle wheel speed sensor becomes "0", the vehicle stop determination device does not determine that the vehicle has stopped. Therefore, the vehicle stop determination device can accurately determine whether the vehicle has stopped.

DESCRIPTION OF EMBODIMENTS

Hereinafter, one embodiment of a control device for a vehicle will be described with reference to the drawings.

Figure 1:
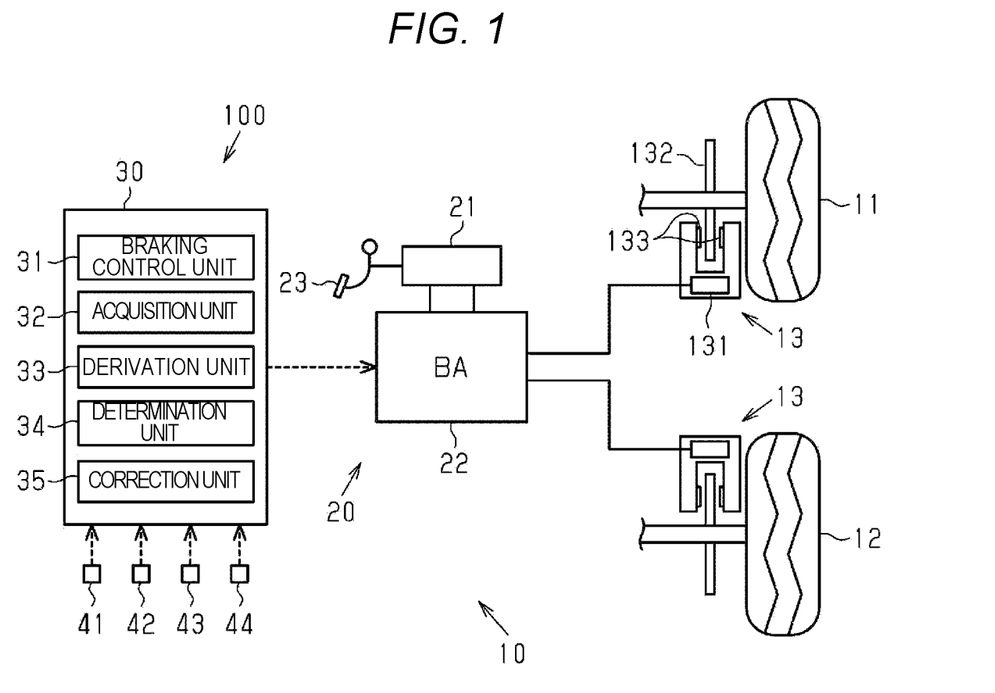
FIG. 1 is a schematic diagram of a vehicle including a vehicle stop determination device according to one embodiment.

FIG. 1 illustrates a schematic configuration of a vehicle 10 including a vehicle stop determination device 100 of the present embodiment. As illustrated in FIG. 1, a braking force is applied to each of a front vehicle wheel 11 and a rear vehicle wheel 12 of the vehicle 10 by the operation of braking mechanisms 13. The braking mechanisms 13 are configured to increase a force, which presses friction materials 133 against rotating bodies 132 integrally rotating with the respective vehicle wheels 11 and 12, as a WC pressure that is a hydraulic pressure in wheel cylinders 131 is increased. For this reason, the braking mechanisms 13 can apply a larger braking force to the vehicle wheels 11 and 12 as the WC pressure is increased.

A brake device 20 for the vehicle 10 includes a hydraulic pressure generating device 21 and a brake actuator 22 to which a brake fluid is supplied from the hydraulic pressure generating device 21. A hydraulic pressure according to an operation amount of a braking operation member 23 by a driver of the vehicle 10 is generated in the hydraulic pressure generating device 21. Examples of the braking operation member 23 can include a brake pedal. The brake actuator 22 is connected to each of the wheel cylinders 131. For this reason, when the braking operation member 23 is operated, the amount of the brake fluid according to an operation amount of the braking operation member 23 is supplied to each of the wheel cylinders 131. Namely, a braking force is applied to each of the vehicle wheels 11 and 12.

Output signals from various detection devices are input to a control device 30. Examples of the detection device can include a stroke sensor 41, a vehicle wheel speed sensor 42, a vehicle position information acquisition device 43, and an object information acquisition device 44.

The stroke sensor 41 outputs a signal according to an operation amount of the braking operation member 23. The vehicle wheel speed sensor 42 outputs a signal with a pulse width according to a rotational speed of the vehicle wheels 11 and 12. For example, the vehicle wheel speed sensor 42 outputs a signal containing 48 pulses while the vehicle wheels 11 and 12 rotate once. In this case, the vehicle wheels 11 and 12 make ⅟₄₈ rotation each time that a pulse appears in the output signal of the vehicle wheel speed sensor 42.

The vehicle position information acquisition device 43 is a global positioning system (GPS) device that acquires position information about a current position of the vehicle 10. The object information acquisition device 44 acquires information about at least one of a position of an object existing around the vehicle 10 and a distance between the vehicle 10 and the object. The object information acquisition device 44 can also be configured to include, for example, a camera, or can also be configured to include a detection device using radar or laser light. Examples of the object can include other vehicles, and signs existing at a roadside.

Next, the control device 30 will be described in detail. Incidentally, in the present embodiment, the vehicle stop determination device 100 is configured to include the control device 30 and the vehicle wheel speed sensor 42.

The control device 30 includes a braking control unit 31, an acquisition unit 32, a derivation unit 33, a determination unit 34, and a correction unit 35 as functional units.

The braking control unit 31 operates the brake actuator 22 of the brake device 20 based on a target braking force BPT according to an operation amount of the braking operation member 23. Thus, the braking control unit 31 individually controls braking forces applied to the vehicle wheels 11 and 12. In other words, the braking control unit 31 controls a braking force applied to the vehicle 10.

In addition, when the vehicle 10 is about to stop, in order to suppress pitching behavior of the vehicle 10, the braking control unit 31 executes pre-stop braking control to adjust the braking force applied to the vehicle 10. The braking control unit 31 determines whether to start the pre-stop braking control, for example, based on a vehicle body speed VS and a vehicle body acceleration AS. When a target stopping position where the vehicle 10 is stopped is determined, the braking control unit 31 may determine whether to start the pre-stop braking control, based on a remaining distance to the target stopping position. On the other hand, the braking control unit 31 determines whether to end the pre-stop braking control, based on whether the vehicle 10 has stopped. In addition, the braking control unit 31 also ends the pre-stop braking control when the operation of the braking operation member 23 is canceled.

When the braking control unit 31 executes the pre-stop braking control, the braking control unit 31 adjusts the braking force applied to the vehicle 10, based on a braking profile that specifies a change over time in the target value of the braking force applied to the vehicle wheels 11 and 12 until the vehicle 10 stops. For this reason, when the braking control unit 31 executes the pre-stop braking control, the braking force applied to the vehicle 10 changes from the target braking force BPT. Incidentally, the braking profile is acquired by the acquisition unit 32 to be described later in consideration of a state of the vehicle 10 at the starting point of the pre-stop braking control, specifically, the vehicle body speed VS and the vehicle body acceleration AS.

The braking profile includes an increase period P1 in which the braking force applied to the vehicle 10 is increased above the target braking force BPT, a reduction period P2 in which the braking force applied to the vehicle 10 is reduced below the target braking force BPT, and a maintenance period P3 in which the braking force applied to the vehicle 10 is maintained. In the reduction period P2 and the maintenance period P3, since the braking force applied to the vehicle 10 becomes less than the target braking force BPT, there is a possibility that when the pre-stop braking control is executed, the braking distance of the vehicle 10 is increased compared to when the pre-stop braking control is not executed. In this regard, the increase period P1 is a period in which the braking distance of the vehicle 10 is increased by applying a braking force larger than the target braking force BPT, to the vehicle 10. The reduction period P2 is a period following the increase period P1. The reduction period P2 is a period in which pitching behavior of the vehicle 10 is suppressed by reducing the braking force applied to the vehicle 10, below the target braking force BPT. The maintenance period P3 is a period following the reduction period P2. The maintenance period P3 is a period in which the system waits for the vehicle 10 to stop in a state where the braking force applied to the vehicle 10 is reduced. Incidentally, the maintenance period P3 can be omitted.

When the pre-stop braking control is ended due to the determination that the vehicle 10 has stopped, in order to maintain the state where the vehicle 10 has stopped, the braking control unit 31 causes the braking force applied to the vehicle 10, to quickly increase toward the target braking force BPT. However, when the braking force applied to the vehicle 10 is increased before the vehicle 10 completely stops, the deceleration of the vehicle 10 increases, so that pitching behavior occurs in the vehicle 10, which is a concern. On the other hand, when there is a time lag between when the vehicle 10 completely stops and when the braking force applied to the vehicle 10 is increased, the state where the vehicle 10 has stopped is not maintained, which is a concern. For example, when the vehicle 10 has stopped on a slope road, the vehicle 10 slides down along the slope road, which is a concern. For this reason, as in the present embodiment, in the control device 30 that changes control contents of actuators of the vehicle 10 before and after the vehicle 10 stops, it is preferable that it is accurately determined whether the vehicle 10 has stopped.

The acquisition unit 32 acquires a wheel speed VW of each of the vehicle wheels 11 and 12 based on an output signal of the vehicle wheel speed sensor 42. In addition, the acquisition unit 32 sets the wheel speed VW of at least one of the vehicle wheels 11 and 12 as the vehicle body speed VS that is a speed of the vehicle 10. Further, the acquisition unit 32 acquires the vehicle body acceleration AS based on the amount of change in the vehicle body speed VS per unit time. The acquisition unit 32 can also acquire a traveled distance of the vehicle 10 from an arbitrary time by counting the number of pulses appearing in an output signal of the vehicle wheel speed sensor 42 from the time.

By the way, the number of pulses per unit time contained in an output signal of the vehicle wheel speed sensor 42 is smaller when the vehicle 10 travels at a low speed than when the vehicle 10 travels at a high speed. For this reason, when the vehicle body speed VS is extremely low, such as immediately before the vehicle 10 stops, the acquisition unit 32 cannot accurately acquire the vehicle body speed VS and the vehicle body acceleration AS based on an output signal of the vehicle wheel speed sensor 42, which is a concern. In this case, the braking control unit 31 cannot correctly determine the time that the vehicle 10 stops, in other words, the time that the pre-stop braking control is ended, which is a concern.

Therefore, the control device 30 of the present embodiment determines whether the vehicle 10 has stopped, based on a traveled distance of the vehicle 10 instead of the vehicle body speed VS. Hereinafter, contents of a processing executed by each functional unit so as to determine whether the vehicle 10 has stopped will be described.

The derivation unit 33 derives a stopping position where the vehicle 10 stops, based on the vehicle body speed VS and the vehicle body acceleration AS acquired at a reference time TS by the acquisition unit 32. In other words, the derivation unit 33 derives a "stopping distance Dx" that is a distance traveled from the reference time TS until the vehicle 10 stops. Namely, a position advanced from the position of the vehicle 10 at the reference time TS by the stopping distance Dx corresponds to the stopping position.

Here, the reference time TS is a time when the vehicle 10 is in deceleration, and is the time that the acquisition unit 32 can accurately acquire the vehicle body speed VS. In the present embodiment, when the vehicle body speed VS acquired by the acquisition unit 32 is a reference speed VSS or higher, the accuracy of acquisition of the vehicle body speed VS is good. For this reason, it can be said that the reference time TS is the time that the vehicle body speed VS is the reference speed VSS or higher. Incidentally, it is preferable that the reference speed VSS is determined according to performance of the vehicle wheel speed sensor 42 and to an outer diameter of the vehicle wheels 11 and 12. As one example, the reference speed VSS is generally approximately several km/h.

Then, when a difference distance between the position of the vehicle 10 after the reference time TS and the stopping position becomes a stop determination value ΔDth1 or less, the determination unit 34 executes a stop determination to determine that the vehicle 10 has stopped. In other words, when a difference between a "cumulative distance Dy" that is a traveled distance of the vehicle 10 from the reference time TS and the stopping distance Dx becomes the stop determination value ΔDth1 or less, the determination unit 34 determines that the vehicle 10 has stopped. Specifically, when a difference obtained by subtracting the cumulative distance Dy from the stopping distance Dx becomes the stop determination value ΔDth1 or less, the determination unit 34 determines that the vehicle 10 has stopped. The cumulative distance Dy is acquired by the acquisition unit 32 based on an output signal of the vehicle wheel speed sensor 42. Namely, the stopping distance Dx is an estimated value, whereas the cumulative distance Dy is an actual measured value. As one example, the stop determination value ΔDth1 may be a distance by which the vehicle 10 advances while the vehicle wheel speed sensor 42 outputs a signal containing one to several pulses.

During execution of the pre-stop braking control, since the braking force applied to the vehicle 10 is changed based on the above-described braking profile, the vehicle body acceleration AS is not maintained constant in a period from the reference time TS until the vehicle 10 stops. For this reason, even when the vehicle body speed VS and the vehicle body acceleration AS at the reference time TS are equal between the case of executing the pre-stop braking control from the reference time TS and the case of not executing the pre-stop braking control, a difference occurs in an actual distance traveled from the reference time TS until the vehicle 10 stops, which is a concern. For this reason, when the pre-stop braking control is executed, the derivation unit 33 derives the stopping position, namely, the stopping distance Dx, also in consideration of the braking profile created at the reference time TS in addition to the vehicle body speed VS and the vehicle body acceleration AS at the reference time TS.

As one example, the derivation unit 33 derives a first traveled distance that is a traveled distance during the increase period P1, based on a length of the increase period P1 and acceleration in the increase period P1. In addition, the derivation unit 33 derives a second traveled distance that is a traveled distance during the reduction period P2, based on a length of the reduction period P2 and acceleration in the reduction period P2. Further, the derivation unit 33 derives a third traveled distance that is a traveled distance during the maintenance period P3, based on a length of the maintenance period P3 and acceleration in the maintenance period P3. Incidentally, the accelerations in the increase period P1, the reduction period P2, and the maintenance period P3 correlate with braking forces in the increase period P1, the reduction period P2, and the maintenance period P3. Then, the derivation unit 33 derives the sum of the first traveled distance, the second traveled distance, and the third traveled distance as the stopping distance Dx.

Further, during execution of the pre-stop braking control, when an external disturbance that accelerates or decelerates the vehicle 10 acts on the vehicle 10, such as when the gradient of a road surface on which the vehicle 10 travels is not constant, even in the case where the braking force applied to the vehicle 10 is controlled based on the braking profile, the actual distance traveled until the vehicle 10 stops deviates from the stopping distance Dx, which is a concern. For this reason, first, the derivation unit 33 derives a stopping profile illustrating a relationship between time and the traveled distance of the vehicle 10 in the period from the reference time TS until the vehicle 10 stops, based on the vehicle body speed VS and the vehicle body acceleration AS acquired at the reference time TS by the acquisition unit 32 and on the braking profile. In the following description, the traveled distance illustrated in the stopping profile is also referred to as an "estimated distance Dz".

Then, when a difference between the estimated distance Dz and the cumulative distance Dy occurs, the correction unit 35 corrects the braking profile to eliminate the difference. For example, when the cumulative distance Dy becomes larger than the estimated distance Dz at a certain time, the correction unit 35 corrects the braking profile such that the braking force applied to the vehicle 10 is increased after the time. In addition, when the cumulative distance Dy is smaller than the estimated distance Dz at a certain time, the correction unit 35 corrects the braking profile such that the braking force applied to the vehicle 10 is reduced after the time. In this case, it is preferable that the correction unit 35 corrects the braking profile such that the larger the difference between the estimated distance Dz and the cumulative distance Dy is, the larger the amount of increase or reduction in the braking force is.

The correction unit 35 uses a correction determination value ΔDth2 as a determination value for determining whether the braking profile can be corrected. Namely, the correction unit 35 corrects the braking profile when the difference between the estimated distance Dz and the cumulative distance Dy is larger than the correction determination value ΔDth2, and the correction unit 35 does not correct the braking profile when the difference between the estimated distance Dz and the cumulative distance Dy is the correction determination value ΔDth2 or less.

However, even when the difference between the estimated distance Dz and the cumulative distance Dy is larger than the correction determination value ΔDth2, in the case where the difference is too large, there is a possibility that even when the correction unit 35 corrects the braking profile, the difference cannot be eliminated. For this reason, when the difference between the estimated distance Dz and the cumulative distance Dy is a cancellation determination value ΔDth3 or larger which is larger than the correction determination value ΔDth2, the braking control unit 31 cancels the pre-stop braking control. Then, the braking control unit 31 causes the braking force applied to the vehicle 10, to quickly increase to the target braking force BPT.

In the present embodiment, during braking of the vehicle 10, the time that the derivation unit 33 derives the stopping distance Dx and the stopping profile is the time that the vehicle body speed VS acquired by the acquisition unit 32 is higher than the reference speed VSS described above and that the vehicle body speed VS has decreased as low as possible. Therefore, when the vehicle body speed VS becomes a speed determination value VSth or less slightly higher than the reference speed VSS, the derivation unit 33 derives the stopping distance Dx and the stopping profile. In addition, in the present embodiment, the braking control unit 31 starts the pre-stop braking control at the time that the acquisition unit 32 derives the stopping distance Dx and the stopping profile. Namely, when the vehicle body speed VS becomes the speed determination value VSth or less, the braking control unit 31 starts the pre-stop braking control.

Next, the flow of a processing executed by the control device 30 will be described with reference to a flowchart illustrated in FIG. 2. This processing is a processing executed in each predetermined control cycle when the vehicle 10 is in deceleration.

Figure 2:
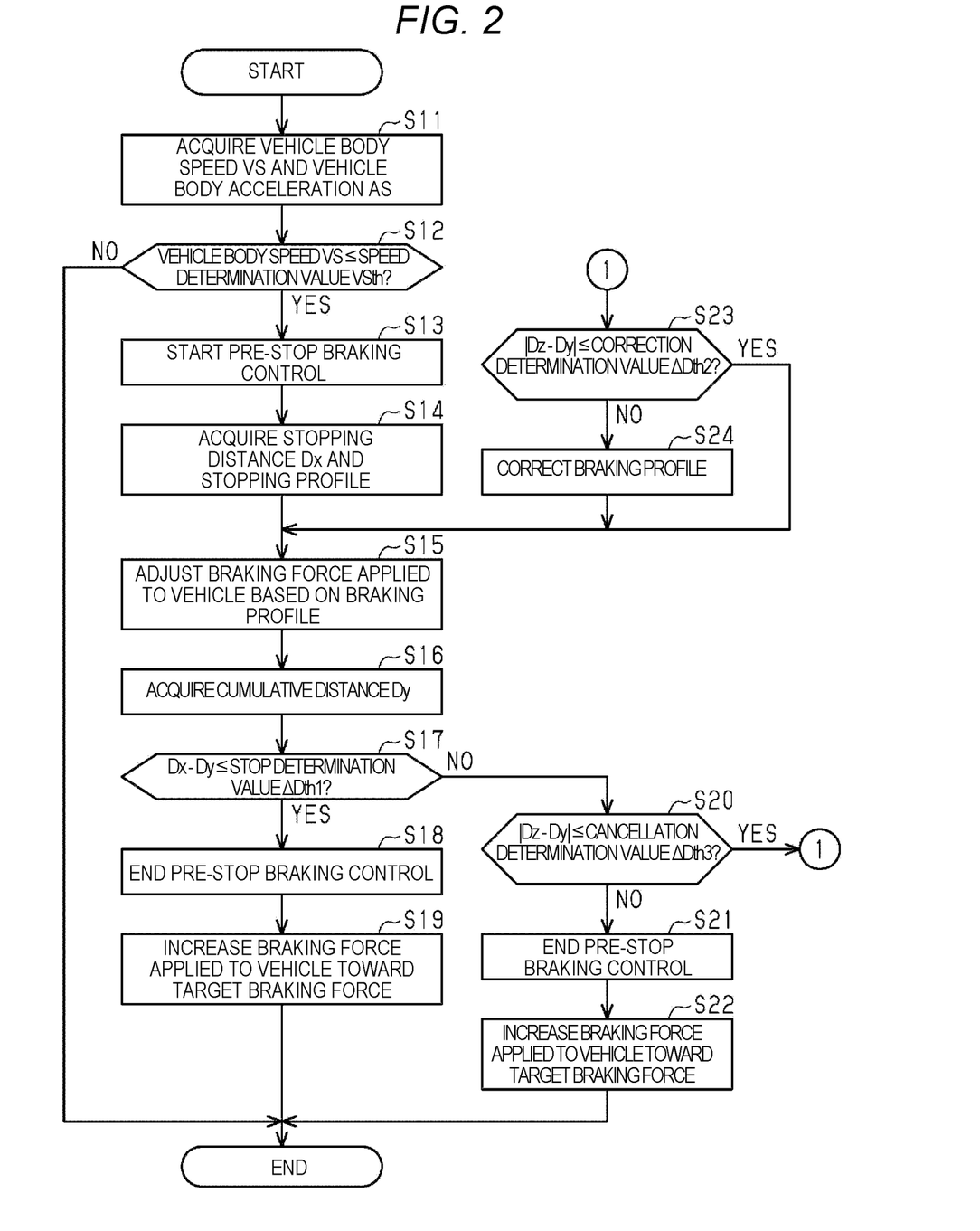
FIG. 2 is a flowchart for describing the flow of a processing executed by the vehicle stop determination device so as to execute pre-stop braking control.

As illustrated in FIG. 2, the control device 30 acquires the vehicle body speed VS and the vehicle body acceleration AS based on an output signal of the vehicle wheel speed sensor 42 (S11). Subsequently, the control device 30 determines whether the vehicle body speed VS is the speed determination value VSth or less (S12). When the vehicle body speed VS is higher than the speed determination value VSth (S12: NO), namely, when the vehicle 10 is not about to stop, the control device 30 ends this processing.

On the other hand, when the vehicle body speed VS is the speed determination value VSth or less (S12: YES), namely, when the vehicle 10 is about to stop, the control device 30 starts the pre-stop braking control (S13). Namely, the control device 30 creates a braking profile, and adjusts the braking force applied to the vehicle 10, based on the braking profile. Then, the control device 30 acquires the stopping distance Dx and a stopping profile (S14). Here, the vehicle body speed VS and the vehicle body acceleration AS required for deriving the stopping distance Dx and the stopping profile are acquired in step S11. Namely, the time that step S11 is executed immediately before step S12 is determined to be affirmative corresponds to the reference time TS.

In the next step S15, the control device 30 adjusts the braking force applied to the vehicle 10, based on the braking profile (S15). For example, the control device 30 acquires a braking force according to an elapsed time from the starting point of the pre-stop braking control, from the braking profile. When the braking force acquired from the braking profile is an indicated braking force, the control device 30 operates the brake device 20 based on the indicated braking force.

Subsequently, the control device 30 acquires the cumulative distance Dy from the reference time TS based on an output signal of the vehicle wheel speed sensor 42 (S16). For example, the cumulative distance Dy can be acquired based on the accumulated value of the number of pulses contained in the output signal of the vehicle wheel speed sensor 42 from the reference time TS.

Then, the control device 30 determines whether the difference obtained by subtracting the cumulative distance Dy from the stopping distance Dx is the stop determination value $\Delta Dth1$ or less (S17). In other words, it is determined whether the difference distance between the current position of the vehicle 10 and the stopping position is the stop determination value $\Delta Dth1$ or less. When the difference obtained by subtracting the cumulative distance Dy from the stopping distance Dx is the stop determination value $\Delta Dth1$ or less (S17: YES), namely, when it can be determined that the vehicle 10 has stopped, the control device 30 ends the pre-stop braking control (S18), and causes the braking force applied to the vehicle 10, to increase toward the target braking force BPT (S19). Thereafter, the control device 30 ends this processing.

On the other hand, in the previous step S17, when the difference obtained by subtracting the cumulative distance Dy from the stopping distance Dx is larger than the stop determination value $\Delta Dth1$ (S17: NO), namely, when it can be determined that the vehicle 10 has not stopped, the control device 30 determines whether the difference between the estimated distance Dz and the cumulative distance Dy in the stopping profile is the cancellation determination value $\Delta Dth3$ or less (S20).

When the difference between the estimated distance Dz and the cumulative distance Dy is larger than the cancellation determination value $\Delta Dth3$ (S20: NO), namely, when a large deviation occurs between an actual traveling mode of the vehicle 10 and the stopping profile, the control device 30 cancels the pre-stop braking control (S21), and causes the braking force applied to the vehicle 10, to increase toward the target braking force BPT (S22). Thereafter, the control device 30 ends this processing.

When the previous steps S18 and S19 are executed, the control device 30 determines that the vehicle 10 has stopped, but when steps S21 and S22 are executed, the control device 30 determines that the vehicle 10 has not stopped. For this reason, it is preferable that the increase speed of the braking force during execution of step S22 in which the vehicle 10 has not stopped is set to be lower than the speed of increase in the braking force during execution of step S19 in which the vehicle 10 has stopped. The reason is that when the braking force applied to the vehicle 10 before stopping is increased in a short period, pitching behavior occurs in the vehicle 10 due to a sudden increase in the deceleration of the vehicle 10.

In the previous step S20, when the difference between the estimated distance Dz and the cumulative distance Dy is the cancellation determination value $\Delta Dth3$ or less (S20: YES), namely, when the deviation between the actual traveling mode of the vehicle 10 and the stopping profile is not so large, the control device 30 determines whether the difference between the estimated distance Dz and the cumulative distance Dy is the correction determination value $\Delta Dth2$ or less (S23).

When the difference between the estimated distance Dz and the cumulative distance Dy is larger than the correction determination value $\Delta Dth2$ (S23: NO), namely, when it can be determined that a deviation occurs between the actual traveling mode of the vehicle 10 and the stopping profile, the control device 30 corrects the braking profile to reduce the difference (S24). Thereafter, the control device 30 proceeds with the process to step S15. In this case, the braking force applied to the vehicle 10 is adjusted based on the braking profile after correction. On the other hand, when the difference between the estimated distance Dz and the cumulative distance Dy is the correction determination value $\Delta Dth2$ or less (S23: YES), namely, when a deviation does not occur between the actual traveling mode of the vehicle 10 and the stopping profile, the control device 30 proceeds with the process to step S15.

Actions and effects of the present embodiment will be described.

Specifically, a transition of the braking force applied to the vehicle 10 that is about to stop, the vehicle body speed, and the traveled distance under the situation where the target braking force BPT is maintained constant will be described with reference to FIGS. 3A to 3C and 4A to 4C.

Figure 3A:
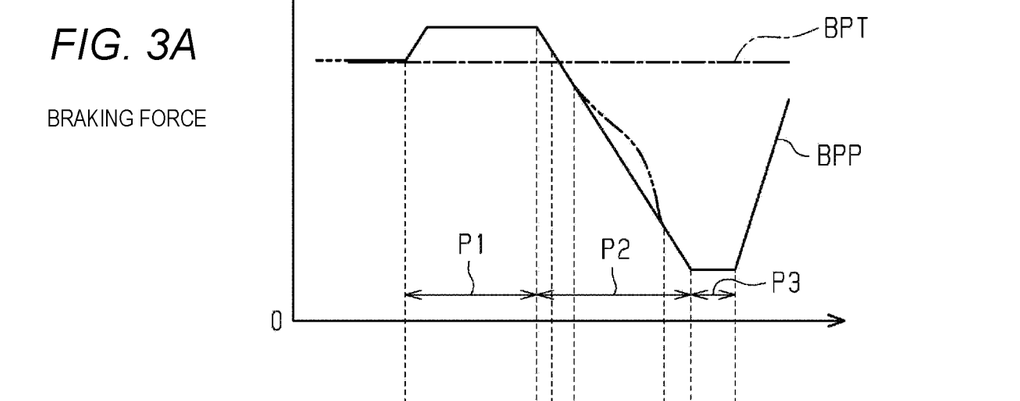
FIGS. 3A to 3C illustrate a timing chart when the vehicle stop determination device executes the pre-stop braking control.
Figure 3B:
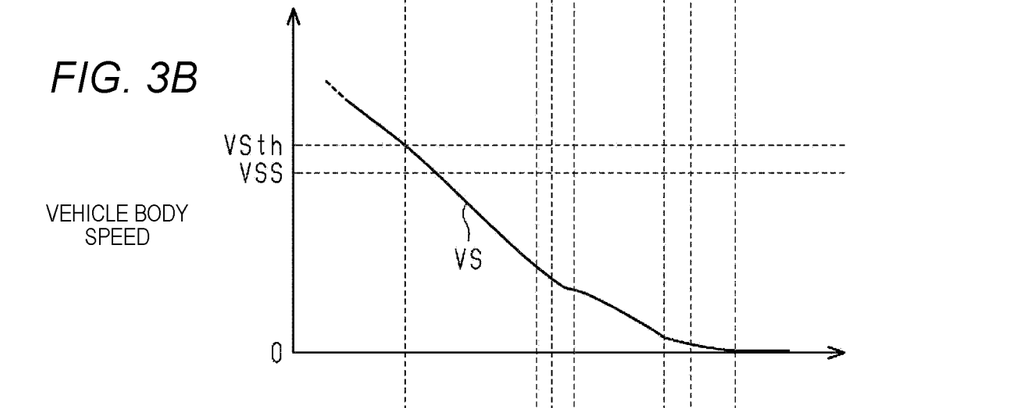
Figure 4A:
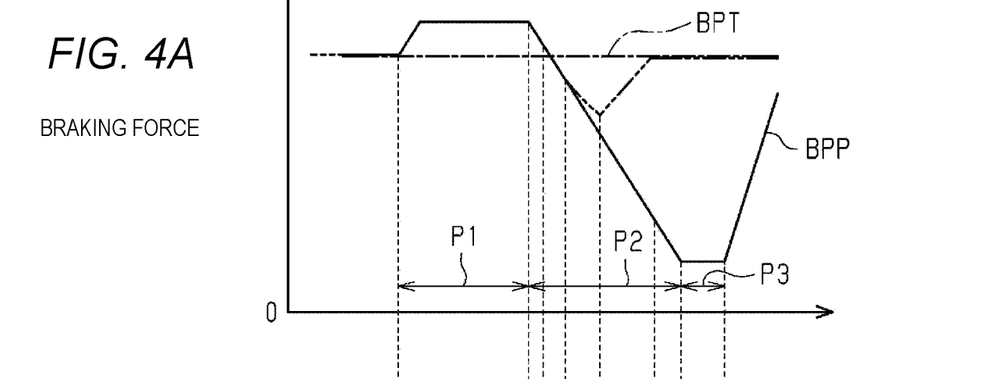
FIGS. 4A to 4C illustrate a timing chart when the vehicle stop determination device executes the pre-stop braking control.

FIGS. 3A and 4A indicate the braking force based on the braking profile, as "BPP". In addition, in FIGS. 3B and 4B, the vehicle body speed VS is an actual traveling speed of the vehicle 10 which cannot be acquired based on an output signal of the vehicle wheel speed sensor 42.

First, the case where an external disturbance acting on the vehicle 10 that is about to stop is small will be described with reference to FIGS. 3A to 3C.

As illustrated in FIGS. 3A and 3B, when a first time t11 that the application of the braking force to the vehicle 10 causes the vehicle body speed VS to become the speed determination value VSth or less is reached, the pre-stop braking control is started. For this reason, the increase period P1 in which the braking force applied to the vehicle 10 is increased above the required braking force starts from the first time t11. In addition, the stopping distance Dx and the stopping profile are derived at the first time t11. Namely, in the example illustrated in FIGS. 3A to 3C, the first time t11 roughly corresponds to the reference time TS.

When a second time t12 is reached, the increase period P1 ends and the reduction period P2 in which the braking force applied to the vehicle 10 is gradually reduced starts. Thereafter, as illustrated in FIG. 3C, when a third time t13 during the reduction period P2 is reached, a difference starts to occur between the estimated distance Dz and the cumulative distance Dy. Specifically, at the third time t13, the cumulative distance Dy starts to increase above the estimated distance Dz due to the application of an external disturbance on the vehicle 10, such as when the vehicle 10 approaches a road surface with a downhill gradient, the external disturbance accelerating the vehicle 10.

At a fourth time t14, when the difference between the estimated distance Dz and the cumulative distance Dy becomes larger than the correction determination value ΔDth2, as indicated by a chain double-dashed line in FIG. 3A, the braking profile is corrected. As illustrated in FIG. 3C, when the cumulative distance Dy becomes larger than the estimated distance Dz, in the case where the braking profile is corrected, the braking force BPP based on the braking profile after correction is increased above the braking force BPP based on the braking profile before correction. As a result, as illustrated in FIG. 3A, the braking force applied to the vehicle 10 is increased.

Figure 3C:
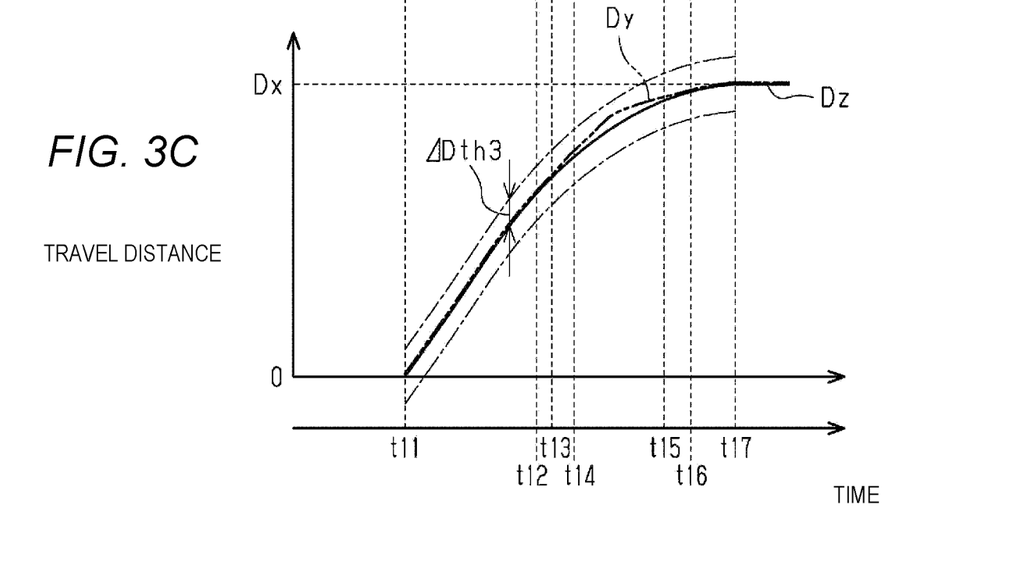

After the fourth time t14, as illustrated in FIG. 3C, the difference between the estimated distance Dz and the cumulative distance Dy temporarily increases and then gradually decreases. In this case, the magnitude of the correction amount of the braking profile gradually decreases. Then, when a fifth time t15 that the difference between the estimated distance Dz and the cumulative distance Dy becomes the correction determination value ΔDth2 or less is reached, as illustrated in FIG. 3A, the braking profile is not corrected.

Thereafter, as illustrated in FIG. 3A, when a sixth time t16 is reached, the reduction period P2 ends and the maintenance period P3 in which the braking force applied to the vehicle 10 is maintained starts. Then, when a seventh time t17 during the maintenance period P3 is reached, as illustrated in FIG. 3C, the stopping distance Dx and the cumulative distance Dy become equal. Specifically, the difference obtained by subtracting the cumulative distance Dy from the stopping distance Dx becomes the stop determination value ΔDth1 or less. In other words, the difference distance between the current position of the vehicle 10 and the stopping position becomes the stop determination value ΔDth1 or less. For this reason, at the seventh time t17, it is determined that the vehicle 10 is stopped. In addition, as illustrated in FIG. 3B, the seventh time t17 is also the time that the traveling speed of the vehicle 10 becomes "0".

In the present embodiment, even when the vehicle body speed VS acquired based on the output signal of the vehicle wheel speed sensor 42 becomes "0" before the seventh time t17, unless the difference obtained by subtracting the cumulative distance Dy from the stopping distance Dx becomes the stop determination value ΔDth1 or less, it is not determined that the vehicle 10 is stopped. Thus, even when the vehicle body speed VS cannot be accurately acquired based on the output signal of the vehicle wheel speed sensor 42, the decrease in the accuracy of determining the stopping of the vehicle 10 is suppressed.

As illustrated in FIG. 3A, after the seventh time t17, the braking force applied to the vehicle 10 is quickly increased toward the target braking force BPT so as to maintain the state where the vehicle 10 has stopped. Namely, the disturbance of behavior of the vehicle caused by a deviation between the stopping time of the vehicle 10 and the increase time of the braking force is suppressed by accurately determining the stopping of the vehicle 10.

In addition, during execution of the pre-stop braking control, when an external disturbance acts to accelerate or decelerate the vehicle 10, the braking profile is corrected to correct the deviation between the estimated distance Dz and the cumulative distance Dy. Then, the braking force applied to the vehicle 10 is adjusted based on the braking profile after correction. For this reason, it is possible to suppress the continuation of the state where the actual traveled distance of the vehicle 10 from the reference time TS has deviated from the estimated distance Dz in the stopping profile.

Subsequently, the case where an external disturbance acting on the vehicle 10 that is about to stop is large will be described with reference to FIGS. 4A to 4C. Since a processing from the first time t11 to the fourth time t14 is substantially the same as that in FIGS. 3A to 3C, a processing after the fourth time t14 will be described.

Figure 4B:
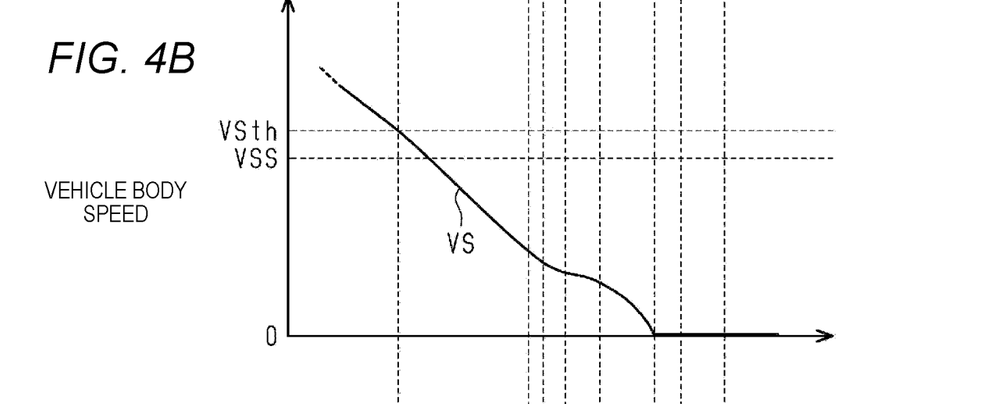
Figure 4C:
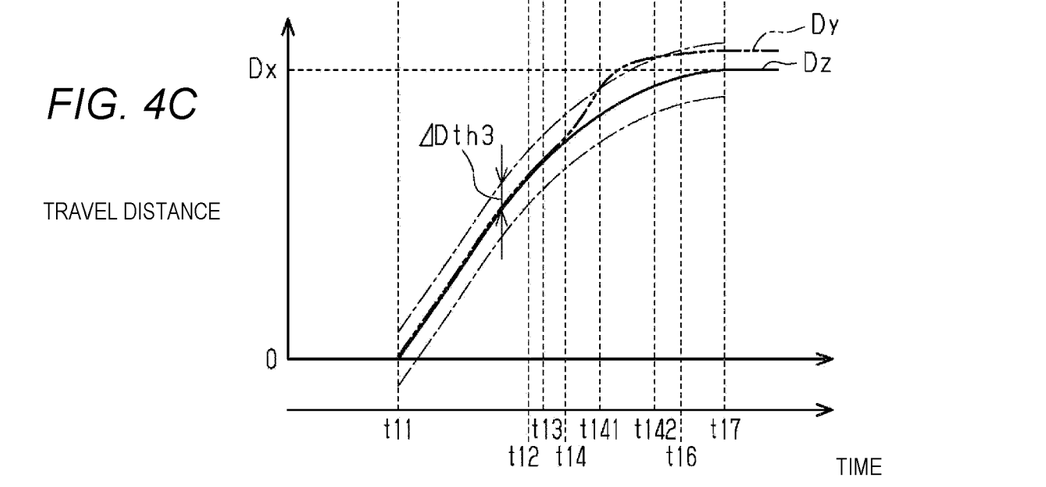

As illustrated in FIGS. 4A to 4C, at the fourth time t14, when the difference between the estimated distance Dz and the cumulative distance Dy becomes larger than the correction determination value ΔDth2, as indicated by a chain double-dashed line in FIG. 4A, the braking profile is corrected. As a result, as illustrated in FIG. 4A, the braking force applied to the vehicle 10 is increased.

By the way, in the case illustrated in FIGS. 4A to 4C, since an external disturbance acting on the vehicle 10 is large, the difference between the estimated distance Dz and the cumulative distance Dy continues to increase even after the fourth time t14. Then, as illustrated in FIG. 4C, at a fifth time t141, when the difference between the estimated distance Dz and the cumulative distance Dy becomes larger than the cancellation determination value ΔDth3, the correction of the braking profile is canceled, in other words, the pre-stop braking control is canceled. Namely, after the fifth time t141, the braking force applied to the vehicle 10 is no longer adjusted based on the braking profile and instead, as indicated by a chain double-dashed line in FIG. 4A, the braking force applied to the vehicle 10 is increased toward the target braking force BPT. For this reason, in the case illustrated in FIGS. 4A to 4C, the vehicle 10 stops at a sixth time t142 that is the time different from the seventh time t17 according to the stopping distance Dx.

Thus, when there is a large deviation between the estimated distance Dz and the cumulative distance Dy, the pre-stop braking control is canceled and the braking force applied to the vehicle 10 becomes the target braking force BPT. For this reason, when an external disturbance acts to greatly accelerate or decelerate the vehicle 10, a situation where the vehicle 10 is braked in a mode different from driver's intention is avoided.

The present embodiment can be changed and implemented as follows. The present embodiment and the following modification examples can be implemented in combination without technically contradicting each other.

The control device 30 may determine that the vehicle 10 has stopped, when the difference distance between the position of the vehicle 10, which changes with time, and the stopping position becomes the stop determination value ΔDth1 or less during execution of the pre-stop braking control. In this case, the position of the vehicle 10 can be derived as follows.

The derivation unit 33 of the control device 30 may derive a position of the vehicle 10 after the reference time TS, based on position information acquired by the vehicle position information acquisition device 43.

The derivation unit 33 of the control device 30 may acquire a position of the vehicle 10 based on information acquired by the object information acquisition device 44. In this case, the derivation unit 33 may acquire a position of the vehicle 10 based on a change in the position of an object, or may acquire a position of the vehicle 10 based on a change in the distance to the object.

The acquisition unit 32 of the control device 30 may correct the cumulative distance Dy derived based on a detection signal of the vehicle wheel speed sensor 42, based on information output by the vehicle position information acquisition device 43 and the object information acquisition device 44.

When a difference occurs between the estimated distance Dz and the cumulative distance Dy, the correction unit 35 of the control device 30 may correct the indicated braking force acquired from the braking profile, instead of correcting the braking profile.

In order to execute a processing other than the pre-stop braking control, the control device 30 may determine whether the vehicle 10 has stopped. Examples of such a processing include automatic brake hold that turns on an electric parking brake after a vehicle has stopped and idling stop that stops an engine after a vehicle has stopped.

When the pre-stop braking control is not executed, the control device 30 may derive the stopping distance Dx based on the vehicle body speed VS and the vehicle body acceleration AS at the reference time TS, while assuming that the target braking force BPT is not changed after the reference time TS. In this case, at the reference time TS, the control device 30 may derive the stopping profile or may adjust the braking force applied to the vehicle 10 based on the difference between the estimated distance Dz and the cumulative distance Dy.

The braking profile may be a braking profile illustrating a relationship between the amount of movement of the vehicle 10 from the reference time TS and the braking force.

The control device 30 may cause a deviation between the time that the stopping distance Dx and the stopping profile are derived and the time that the execution of the pre-stop braking control is started.

During repeated execution of the pre-stop braking control, when the difference between the estimated distance Dz and the cumulative distance Dy becomes larger than the cancellation determination value ΔDth3 multiple times, in other words, when the pre-stop braking control is abnormally ended multiple times, the control device 30 may learn about this case. For example, in the above case, the control device 30 may learn that due to characteristics of the vehicle, the pre-stop braking control has ended abnormally, and may increase the cancellation determination value ΔDth3.

The vehicle 10 may include a regenerative brake device that applies a regenerative braking force to the vehicle wheels 11 and 12. In this case, the control device 30 can adjust the magnitude of the braking force applied to the vehicle 10 by causing a change in the regenerative braking force applied to the vehicle wheels 11 and 12.

The control device 30 may have any one of the following configurations (a) to (c). (a) The control device 30 includes one or more processors that execute various processes according to a computer program. The processor includes a CPU and memories such as a RAM and a ROM. The memories store program codes or commands configured to cause the CPU to execute processes. The memories, namely, computer-readable media include any available media that can be accessed by a general-purpose or dedicated computer. (b) The control device 30 includes one or more dedicated hardware circuits that execute various processes. Examples of the dedicated hardware circuit can include an application specific integrated circuit, namely, ASIC or FPGA. ASIC is an abbreviation for an "application specific integrated circuit", and FPGA is an abbreviation for a "field programmable gate array". (c) The control device 30 includes a processor that executes some of various processes according to a computer program and a dedicated hardware circuit that executes the remaining of the various processes.

The invention claimed is:

1. A vehicle stop determination device comprising:
a vehicle wheel speed sensor that outputs a signal according to a rotational speed of a wheel;
an acquisition unit that acquires a vehicle body speed and a vehicle acceleration at a predetermined reference time that a vehicle decelerates, based on an output signal of the vehicle wheel speed sensor;
a derivation unit that derives a stopping position where the vehicle stops, based on the vehicle body speed and the vehicle acceleration acquired by the acquisition unit;
a determination unit that executes a stop determination to determine that the vehicle has stopped, when a difference distance between a position of the vehicle after the reference time and the stopping position is a stop determination value or less; and
a braking control unit that adjusts a braking force applied to the wheel, based on a braking profile that specifies a change over time in a target value of the braking force applied to the wheel until the vehicle stops, wherein
the derivation unit derives a stopping profile illustrating a relationship between time and the traveled distance of the vehicle in the period from the reference time until the vehicle stops, based on the vehicle body speed and the vehicle body acceleration acquired at the reference time by the acquisition unit and on the braking profile,
the vehicle stop determination device further comprising:
a correction unit that corrects the braking profile to eliminate a difference between an estimated distance and a cumulative distance when the difference occurs, the estimated distance is the traveled distance illustrated in the stopping profile, and the cumulative distance is acquired by the acquisition unit based on the output signal of the vehicle wheel speed sensor.

2. The vehicle stop determination device according to claim 1,
wherein the acquisition unit acquires the braking profile at the reference time, and
the derivation unit derives the stopping position based on the braking profile acquired by the acquisition unit.

3. The vehicle stop determination device according to claim 2, wherein the reference time is a time that the wheel speed is a reference speed or higher.

4. The vehicle stop determination device according to claim 3,
wherein the vehicle includes a vehicle position information acquisition device that acquires position information about a current position of the vehicle, and
the derivation unit derives the position of the vehicle after the reference time based on the position information acquired by the vehicle position information acquisition device.

5. The vehicle stop determination device according to claim 3,
wherein the vehicle includes an object information acquisition device that acquires information about at least one of a position of an object existing around the vehicle and a distance between the vehicle and the object, and
the derivation unit derives the position of the vehicle based on the information acquired by the object information acquisition device.

6. The vehicle stop determination device according to claim 1, wherein the reference time is a time that the wheel speed is a reference speed or higher.

7. The vehicle stop determination device according to claim 6,
wherein the vehicle includes a vehicle position information acquisition device that acquires position information about a current position of the vehicle, and
the derivation unit derives the position of the vehicle after the reference time based on the position information acquired by the vehicle position information acquisition device.

8. The vehicle stop determination device according to claim 6,
wherein the vehicle includes an object information acquisition device that acquires information about at least one of a position of an object existing around the vehicle and a distance between the vehicle and the object, and
the derivation unit derives the position of the vehicle based on the information acquired by the object information acquisition device.

9. The vehicle stop determination device according to claim 2,
wherein the vehicle includes a vehicle position information acquisition device that acquires position information about a current position of the vehicle, and
the derivation unit derives the position of the vehicle after the reference time based on the position information acquired by the vehicle position information acquisition device.

10. The vehicle stop determination device according to claim 2,
wherein the vehicle includes an object information acquisition device that acquires information about at least one of a position of an object existing around the vehicle and a distance between the vehicle and the object, and
the derivation unit derives the position of the vehicle based on the information acquired by the object information acquisition device.

11. The vehicle stop determination device according to claim 1,
wherein the vehicle includes a vehicle position information acquisition device that acquires position information about a current position of the vehicle, and
the derivation unit derives the position of the vehicle after the reference time based on the position information acquired by the vehicle position information acquisition device.

12. The vehicle stop determination device according to claim 1,
wherein the vehicle includes an object information acquisition device that acquires information about at least one of a position of an object existing around the vehicle and a distance between the vehicle and the object, and
the derivation unit derives the position of the vehicle based on the information acquired by the object information acquisition device.

* * * * *